(12) United States Patent
Galand et al.

(10) Patent No.: US 7,813,375 B2
(45) Date of Patent: Oct. 12, 2010

(54) PROCESS TO TRANSFER A TIME DIVISION MULTIPLEXING (TDM) FRAME OVER A MPLS NETWORK

(75) Inventors: Damien Galand, Chaville (FR); Tan-Nhon Pham, Antony (FR)

(73) Assignee: Alcatel, Paris (FR)

( * ) Notice: Subject to any disclaimer, the term of this patent is extended or adjusted under 35 U.S.C. 154(b) by 1574 days.

(21) Appl. No.: 10/994,916

(22) Filed: Nov. 23, 2004

(65) Prior Publication Data
US 2005/0135405 A1 Jun. 23, 2005

(30) Foreign Application Priority Data
Dec. 19, 2003 (EP) .................................. 03293270

(51) Int. Cl.
H04J 3/16 (2006.01)
H04J 3/24 (2006.01)
(52) U.S. Cl. .................. 370/468; 370/466; 370/539; 370/541; 370/314
(58) Field of Classification Search ................. 370/348, 370/468, 470
See application file for complete search history.

(56) References Cited

U.S. PATENT DOCUMENTS

| 6,813,654 | B1 * | 11/2004 | Ishibashi | 710/36 |
|---|---|---|---|---|
| 7,006,525 | B1 * | 2/2006 | Jha | 370/466 |
| 7,133,403 | B1 * | 11/2006 | Mo et al. | 370/390 |
| 7,158,515 | B1 * | 1/2007 | Wang et al. | 370/392 |
| 2002/0085567 | A1 * | 7/2002 | Ku et al. | 370/396 |
| 2002/0172155 | A1 | 11/2002 | Kasvand-Harris et al. | |
| 2003/0026250 | A1 * | 2/2003 | Fang | 370/386 |
| 2005/0180431 | A1 * | 8/2005 | Kinoshita et al. | 370/397 |

FOREIGN PATENT DOCUMENTS

WO  WO 02/17542 A2  2/2002

OTHER PUBLICATIONS

"Synchronous Optical network (SONET) Transport Systems: Common Generic Criteria, ( A Module of TSGR, FR-440)," Telcordia Technologies- Performance from Experience, GR-253-CORE, Sep. 2000, Issue 3.
"Network node interface for the synchronous digital hierarchy (SDH)," International Telecommunication Union, (ITU), Telecommunication Standardization Sector of ITU (ITU-T) G.707, Series G: Transmission Systems and Media, Digital Transmission systems-Terminal equipments-General, Mar. 1996.

* cited by examiner

Primary Examiner—Ajit Patel
(74) Attorney, Agent, or Firm—Sughrue Mion, PLLC

(57) ABSTRACT

A process to transfer a Time division Multiplexing (TDM) frame (1) over a MPLS network (2), the frame including a plurality of time slots (TS1, TS2, TS3) with specific bandwidths, including—identifying the corresponding bandwidth of the time slots of the frame (1);—creating and reserving into the MPLS network (2) for each time slot (TS1,TS2,TS3) of the frame a corresponding label switched path (LSP1, LSP2, LSP3) having a bandwidth substantially identical to the bandwidth of the time slot;—and routing each time slot (TS1, TS2, TS3) over the MPLS network (2) through a corresponding label switched path (LSP1, LSP2, LSP3).

10 Claims, 1 Drawing Sheet

PROCESS TO TRANSFER A TIME DIVISION MULTIPLEXING (TDM) FRAME OVER A MPLS NETWORK

BACKGROUND

1. Field

The present invention relates to a process to transfer a Time division Multiplexing (TDM) frame over a MPLS network, said frame comprising a plurality of time slots with specific bandwidths 2. Description of the Related Art European and Asian network SDH (Network Node Interface for the Synchronous Digital Hierarchy; see International Telecommunication Union, recommendation G.707. March 1996) and its American homologue SONET (Synchronous Optical Network Transport Systems; see GR-253-CORE, issue 2, Revision A, December 1997) are inflexible TDM (Time Division Multiplexing) based transport architectures.

These optical networks have large bandwidth, good reliability and are mostly used in voice transport, that knows an increasingly success. SDH/SONET proposes a frame structure in which the different afferent signals are mixed or multiplexed by synchronised interlacing of octets and are encapsulated into virtual containers of a given size. A given number of containers hanged together are sent by time slots. The bandwidth (size, data rate) of the time slots depends on the hierarchy optical level of the SDH/SONET and on the transport structure of the optical fibre network (see ITU; standard G.803 Architectures of Transport networks based on the synchronous digital hierarchy).

The hierarchy level gives the line rate of the communication in the manner set forth in table 1 for SDH and SONET, wherein respectively STM (Synchronous Transport Module) and OC (Optical Container) are unitary data carrier.

TABLE 1

| Optical level SDH | Optical level SONET | Line Rate (Mbps) |
|---|---|---|
|  | OC-1 | 51 |
| STM-1 | OC-3 | 155 |
| STM-4 | OC-12 | 622 |
| STM-16 | OC-48 | 2500 |
| STM-64 | OC-192 | 10000 |
| STM-128 | OC-384 | 20000 |
| STM-256 | OC-768 | 40000 |

The transport structure of SDH/SONET establishes the number of channels the SDH/SONET line rate uses for the transport.

The entire line rate can be transported on a "concatenated" (or "clear") channel, which means that the entire line rate is available as a single channel of communication and that the entire line rate may be used by a single flow of time slots.

Otherwise the line rate can be "channelized" and the line rate is subdivided into multiple fixed rate channels. For example, the payload of an OC-48 link may be subdivided into four OC-12 channels. In this case, the data rate of a single time slot flow is limited by and to the bandwidth of an individual channel.

To summarise, SDH/SONET frames are transported in a synchronised manner, by a succession of predefined bandwidth time slots, the bandwidth of the time slot depending on the conditions of the SDH/SONET transmission.

MPLS (Multiprotocol Label Switching Architecture; see Internet Engineering Task Force, RFC 3031) networks are wire networks that provide a good handiness for the bandwidth administration and the development of the quality of service in terms of scaleability, routing and adaptability. In a MPLS network the data are transferred by packets on LSPs (Label Switched Paths) having specific bandwidths.

The transfer of SDH/SONET frames over a MPLS network is necessary when a SDH/SONET network goes through a MPLS network because there is no other path or because a network operator wants to control and monitor the information transmitted on the SDH/SONET network.

A process to transfer a SDH/SONET frame over a MPLS network exists and consists in cutting the SDH/SONET frame or more precisely each associated time slots when they enter the MPLS network in order to create packets with given bandwidths that can go through the pre-existing LSPs of the MPLS network. The cut is done according to the bandwidth of the existing LSPs. The time slots and thus the SDH/SONET frame are then reconstructed (reassembled) at the output of the MPLS network by rearranging all the packets ones after the others. The cut and the reconstruction of the SDH/SONET frame occur respectively into input and output routers of the MPLS network.

This process does not ensure an optimal transfer of the SDH/SONET frames because the time slots have to be cut and the reconstruction is complex. Moreover, it does not take into account the dynamicity of the SDH/SONET frame.

SUMMARY

The object of the invention is to eliminate the above-mentioned drawbacks by providing a method in which the transfer into the MPLS network is adapted dynamically to TDM frames, in particular SDH/SONET frames, and avoid complex reconstruction of the TDM resp. SDH/SONET frames.

According to the present invention, there is provided a process to transfer a Time division Multiplexing (TDM) frame over a MPLS network, said frame comprising a plurality of time slots with specific bandwidths, characterised by the steps of:

identifying the corresponding bandwidth of the time slots of the frame;

creating and reserving into said MPLS network for each time slot of the frame a corresponding label switched path (LSP) having a bandwidth substantially identical to the bandwidth of the time slot;

and routing each time slot over the MPLS network through a corresponding label switched path.

According to another embodiment of the invention, the said TDM frame is a SDH/SONET frame.

As a result, the time slots of the SDH/SONET frame can be sent over the MPLS network without been cut, facilitating then the reconstruction of the frame and reducing the length of the transfer process.

Further according to the present invention, there is provided a router to transfer a TDM frame over a MPLS network, said frame comprising a plurality of time slots with specific bandwidths, characterised in that it is designed to:

identify the corresponding bandwidth of the time slots of the frame;

create and reserve into said MPLS network for each time slot of the frame a corresponding label switched path having a bandwidth substantially identical to the bandwidth of the time slot;

and route each time slot over the MPLS network through a corresponding label switched path.

Further according to the present invention, there is provided SDH/SONET network comprising the router described here above.

BRIEF DESCRIPTION OF THE DRAWINGS

The present invention will be further understood and appreciated from the following detailed description taken in conjunction with the drawings in which.

DETAILED DESCRIPTION OF EXEMPLARY EMBODIMENTS

Figure 1:
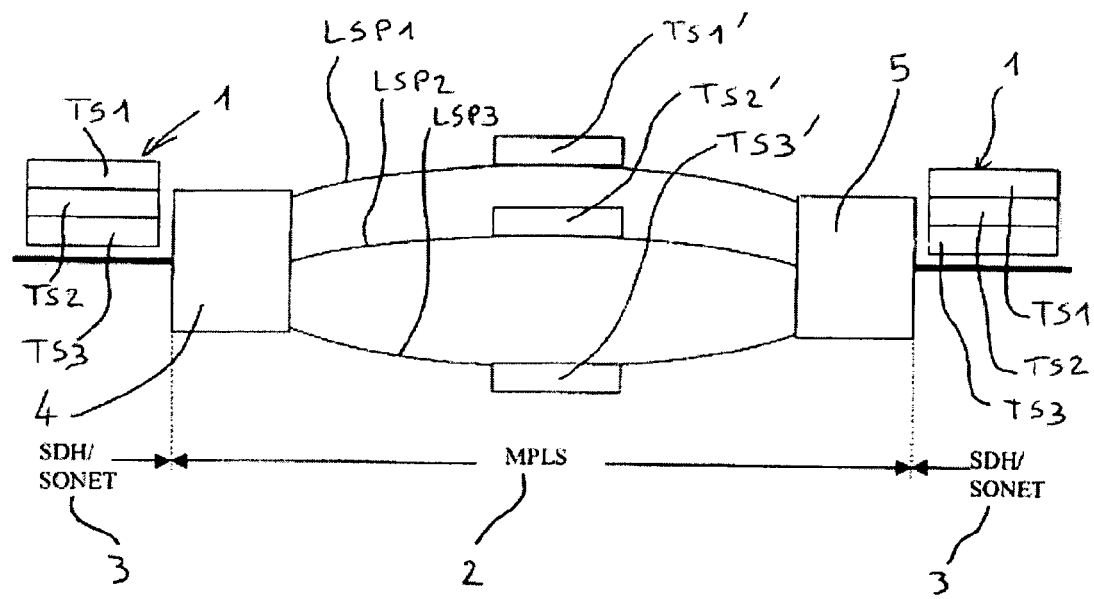
FIG. 1 is a schematic block diagram of the process of transfer of a SDH/SONET frame over a MPLS network according to the invention.

FIG. 1 schematically shows the process of the transfer of a SDH/SONET frame 1 over a MPLS network 2. An incoming SDH/SONET frame 1 transported on a transmitting SDH/SONET network 3 is composed of several time slots TSs, for example three into the FIG. 1, TS1, TS2, TS3. These time slots TS1, TS2, TS3 have given bandwidths, according to the structure and configuration of the SDH/SONET network 3. The time slots TS1, TS2, TS3 enters the MPLS network 2 through an input SDH/SONET/MPLS border router 4. Each time slot TS1, TS2, TS3 is extracted from the SDH/SONET frame then routed and transferred respectively into the said input router 4 on a specific label switched path LSP1, LSP2, LSP3 into the MPLS network 2 up to an output SDH/SONET/MPLS border router 5 respectively as MPLS data packets TS1', TS2', TS3'. In this said output router 5, the MPLS data packets TS1', TS2', TS3' are reconfigured as time slots TS1, TS2, TS3 which are reassembled together to form an outgoing SDH/SONET frame 1 identical to the incoming SDH/SONET frame 1 and transported on a receiving SDH/SONET network 3.

Figure 2:
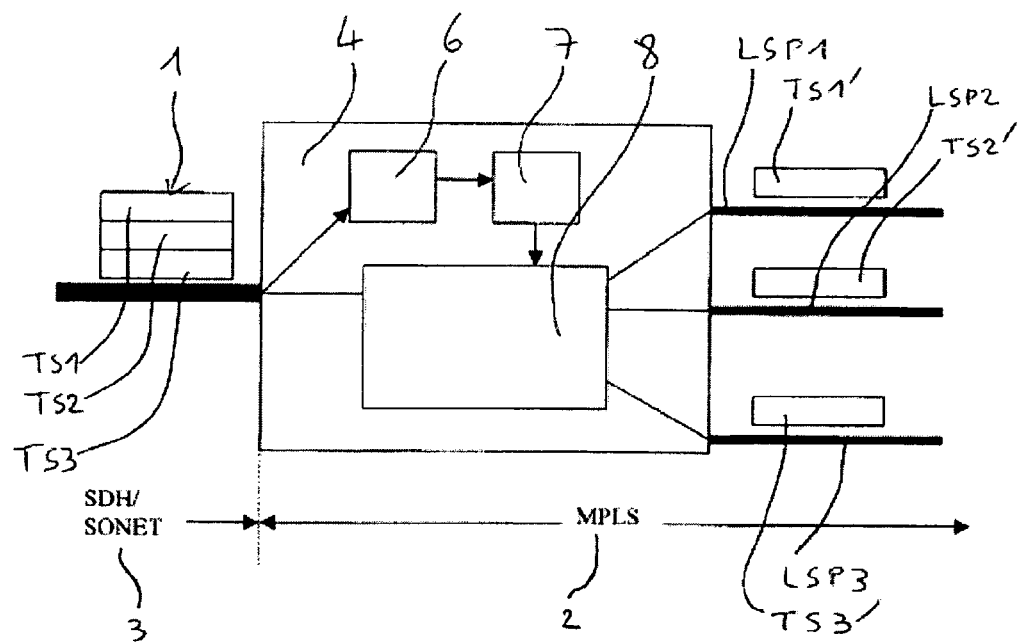
FIG. 2 is a schematic block diagram of the SDH/SONET/MPLS routing process according to the invention.

The FIG. 2 shows in detail a part of the process of FIG. 1, more particularly how the SDH/SONET frame 1 is processed into the input router 4. The input router 4 is composed of a monitoring module 6, an adaptive load balancing application component 7 and a routing and forwarding module 8.

The embedded monitoring module 6 identifies the composition of the incoming SDH/SONET frame 1. It identifies automatically the number and type of time slots and the bandwidths of the time slots of the frame. According to the type of the frame, the monitoring module 6 asks the adaptive load balancing application component 7 for an auto adaptation of the frame transfer between the two networks 2, 3. The adaptive load balancing application component 7 triggers a load balancing session between the two routers 4, 5 (see FIG. 1) at the border of the MPLS network 2 that defines the ways between the SDH/SONET networks 3. During the load balancing session the load balancing application component 7 asks for an adapted allocation of the bandwidths between the two routers 4, 5 in order to create and reserve label switched paths LSP1, LSP2, LSP3 having substantially similar bandwidths as the bandwidth of the time slots TS1, TS2, TS3 of the SDH/SONET frame 1. The request and reservation for LSPs of given bandwidths is done by asking the MPLS network managing element not represented, and by sending indications and routing information into the MPLS network.

In the same time, the load balancing application component 7 configures the routing and forwarding module 8 with the information about the time slots TS1, TS2, TS3 and their associated reserved label switched paths LSP1, LSP2, LSP3. By this way into the routing and forwarding module 8, each time slot TS1, TS2, TS3 is transformed in one MPLS packet TS1', TS2', TS3' and mapped onto the associated label switched path LSP1, LSP2, LSP3.

The correct split of the time slots constituting the SDH/SONET frame 1 over different LSPs of the same load balancing session will facilitate the reconstruction of the frame 1 in a basic reconstruction module not represented of the output router 5 of the MPLS network.

At the output of the MPLS network 2, as visible in FIG. 1, into the output router 5 each MPLS packet TS1', TS2', TS3' is reconfigured in time slot TS1, TS2, TS3 and the SDH/SONET frame 1 is reconstituted identically as before the input into the MPLS network 2, by only respecting the sequence of the time slots TS1, TS2, TS3.

According to this invention, the time slots of the SDH/SONET frame do not have to be cut in order to be sent over the MPLS network, facilitating then the reconstruction of the frame and reducing the length of the transfer process.

The present invention allows a dynamic adaptation of the transfer of SDH/SONET frames over a MPLS network. The constitution of the incoming frame is determined automatically and the MPLS network adapts itself accordingly.

Furthermore, the adaptive load balancing application component can trigger a new load balancing session or adapt an existing one in creating and adding for instance a new LSP.

The adaptive load balancing application component further can take into account the different QoS (Quality of Service) and CoS (Class of Service) of the network users, for example the order of priority for the mapping of different frames.

This invention will reduce comparatively for the network operators the purchase and operational expenses of the MPLS-SDH/SONET networks by optimising the topological resources of the networks.

It will be appreciated that the invention is not limited to what has been described here above by way of example and can be used for frames transfer in other network types, for example it can be extended to other TDM frames entering a MPLS network. Rather, the invention is limited solely by the claims that follow.

The invention claimed is:

1. A method of transferring a Time Division Multiplexing (TDM) frame over a Multiprotocol Label Switching Architecture (MPLS) network, said TDM frame comprising a plurality of time slots with specific bandwidths, the method comprising:

identifying corresponding bandwidth of the time slots of the TDM frame;

creating and reserving, by a load balancing application component, into said MPLS network for each time slot of the TDM frame a corresponding label switched path having a bandwidth identical to the bandwidth of the time slot; and routing each time slot over the MPLS network through the corresponding label switched path, wherein the bandwidth of the corresponding label switched path is automatically adapted to have a bandwidth identical to the bandwidth of the time slot.

2. The method according to claim 1, wherein said TDM frame is a Synchronous Digital Hierarchy/Synchronous Optical Network Transport Systems (SDH/SONET) frame.

3. A router for transferring a (Time Division Multiplexing (TDM) frame over a Multiprotocol Label Switching Architecture (MPLS) network, said TDM frame comprising a plurality of time slots with specific bandwidths, the router comprising:

a monitoring module which identifies corresponding bandwidth of the time slots of the frame;

a load balancing application component which creates and reserves into said MPLS network for each time slot of the frame a corresponding label switched path (LSP) having a bandwidth identical to the bandwidth of the time slot; and a routing and forwarding module which routes each time slot over the MPLS network through a corresponding label switched path, wherein the bandwidth of the corresponding label switched path is automatically adapted to have a bandwidth identical to the bandwidth of the time slot.

4. A SDH/SONET network comprising a router according to claim 3.

5. The method according the claim 1, further comprising:

identifying a number and a type of the plurality of time slots.

6. The method according to claim 3, wherein the monitoring module identifies a number and a type of the plurality of time slots.

7. The router according to claim 3, wherein the load balancing application component triggers a new load balancing session when creating and adding a new LSP.

8. The router according to claim 3, wherein the load balancing application component triggers an existing load balancing session when creating and adding a new LSP.

9. The router according to claim 3, wherein the load balancing application component takes into account a different Quality of Service (QoS) and Class of Service (CoS) of a user the network, generating an order of priority for mapping of different frames.

10. The method of claim 1, further comprising:

taking into account a different Quality of Service (QoS) and Class of Service (CoS) of a user the network, generating an order of priority for mapping of different frames.

* * * * *